(12) United States Patent
Goto

(10) Patent No.: US 7,447,695 B2
(45) Date of Patent: Nov. 4, 2008

(54) COMPUTER APPARATUS

(75) Inventor: Yoshimitsu Goto, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 505 days.

(21) Appl. No.: 11/023,824

(22) Filed: Dec. 27, 2004

(65) Prior Publication Data

US 2006/0139672 A1 Jun. 29, 2006

(51) Int. Cl.
*G06F 17/30* (2006.01)

(52) U.S. Cl. ............... 707/100; 707/1; 707/101; 707/102; 709/203

(58) Field of Classification Search .......... 707/1, 707/100, 101, 102; 709/203
See application file for complete search history.

(56) References Cited

U.S. PATENT DOCUMENTS

| | | | |
|---|---|---|---|
| 5,768,483 A * | 6/1998 | Maniwa et al. ............ 358/1.15 |
| 6,779,178 B1 * | 8/2004 | Lloyd et al. .............. 717/174 |
| 7,020,132 B1 * | 3/2006 | Narasimhan et al. ...... 370/355 |
| 2003/0144970 A1 * | 7/2003 | Coyne .................. 705/400 |
| 2004/0236862 A1 * | 11/2004 | Ito et al. ................ 709/230 |
| 2004/0254949 A1 * | 12/2004 | Amirthalingam ......... 707/101 |

FOREIGN PATENT DOCUMENTS

JP 11-045077 2/1999

* cited by examiner

*Primary Examiner*—Cheryl Lewis
(74) *Attorney, Agent, or Firm*—SoCal IP Law Group LLP; Steven C. Sereboff; John E. Gunther

(57) ABSTRACT

A computer apparatus has a type data storing part which stores type data regarding file types set according to models of image forming devices and a data file storing part which stores data files of described file types acquired from the image forming devices. The apparatus receives a selection of the models of The image forming devices with the data files acquired thereby and the data files stored in the data file storing part, and selections of the model of the image forming device outputting the data files, the file types different from the described file types and storage destinations of the data files. When receiving an instruction for a conversion, the apparatus converts the data files stored in the data file storing part into file types different from the described file types and stores them in the storage destinations of the data files.

13 Claims, 6 Drawing Sheets

COMPUTER APPARATUS

BACKGROUND OF THE INVENTION

1. Field of the Invention

This invention relates to a computer apparatus which converts file types of data files acquired from an image forming device.

2. Description of the Related Art

An image forming device such a multi-function peripheral (MFP) stores a variety of pieces of data in a hard disk drive (HDD). For example, the data files of address data indication address book of facsimile transmission and template data indicating templates to set with what settings and to which box a scanning data by a scanning function should be stored, etc, are stored in HDD.

The data files thus stored in the HDD are stored in the file types preset for each image forming device. That is, the file types of the data files of the address book and the templates are different for every image forming device. Since the file types are different, the data files are not compatible with one another, and it is impossible to transfer the data files created by a model used by a user to a new model when the user changes the model of image forming device. Conventionally, the user recreates the address book and the templates with the new image forming device when changing the image forming device.

Accordingly, there is a need for a computer apparatus capable of converting the file types of the data files of the address book and the templates stored in the image forming device into file types matching the model of the image forming device.

BRIEF SUMMARY OF THE INVENTION

According to one mode of this invention, a computer apparatus comprises an interface to be communicably connected to an image forming device with data files of prescribed file types stored therein; a type data storing part which stores type data on the file types set according to a model of the image forming device; a data file storing part which stores the data files of the prescribed file types acquired from the image forming device via the interface; a first reception part configured to receive a selection of the model of the image forming device with the data files acquired thereby and a selection of the data files stored in the data file storing part; a second reception part configured to receive a selection of the model of the image forming device for outputting the data files, a selection of the file types different from the described file types and selection of storage destinations of the data files; a third reception part configured to receive a selection of an instruction for converting the file types; a conversion control part configured to convert the data files selected by the first reception part into the file types selected by the second reception part from the prescribed file types when the third reception part receives the instruction; and a storage control part configured to store the data files converted by the conversion control part into the storage destinations selected by the second reception part.

Objects and advantage of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

DETAILED DESCRIPTION OF THE INVENTION

Figure 1:
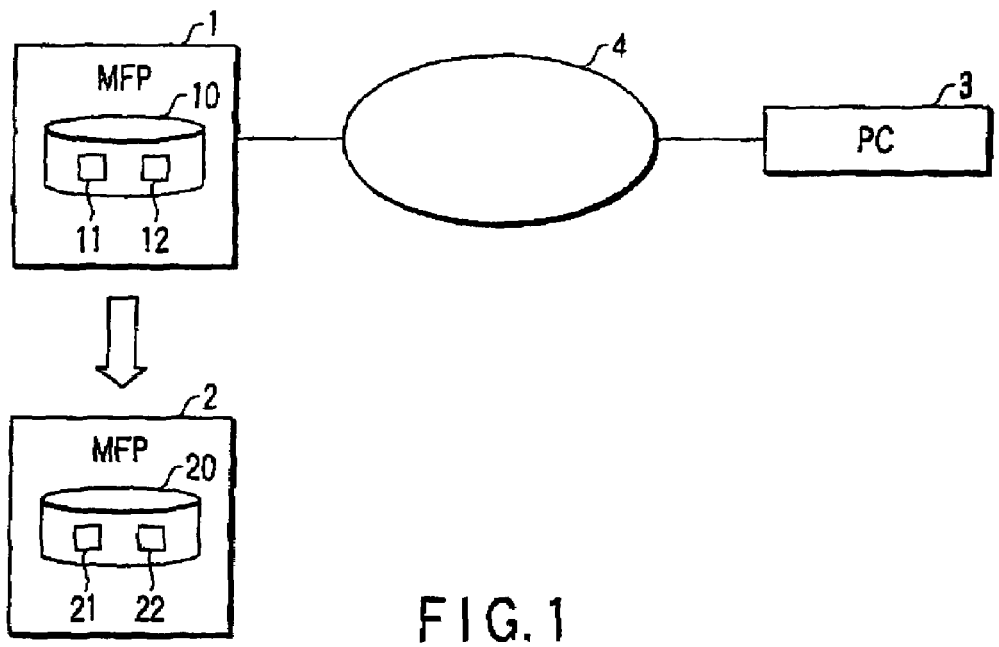
FIG. 1 is a schematic illustration showing a network structure before changing an image forming device in an embodiment of the invention.

Hereinafter, an embodiment of the present invention will be explained by referring to the drawings.

FIG. 1 is a schematic illustration showing a network structure. A multi-function peripheral (MFP) 1 is in the use by a user and an MFP 2 will be newly used by the user. The MFP 1 and a personal computer (PC) 3 to be the computer apparatus are communicably connected via a network 4 such as the Internet.

The MFPs 1, 2 are different in model; however, both of them have, for example, a facsimile function, a network scanning function, a network printing function, a copying function, etc. The MFP 1 has an HDD 10. The HDD 10 has an address data storing part 11 and a template data storing part 12. The storing part 11 stores the address data indicating addresses used for facsimiles, as the data files. The storing part 12 stores the data files indicating the templates to set, for example, with what setting (for example, resolution, color/monochrome, etc.) and to which box the data scanned by the scanning function should be stored. The file types of the data files thus stored in storing parts 11, 12 of the MFP 1 are stored in the prescribed types. Similarly in the MFP 2, an address data storing part 21 and a template data storing part 22 are disposed in an HDD 20. The file types of the data files stored into the storing parts 21, 22 are different from the file types for storing the data files of the MFP 1. The boxes are provided to classify and store the data such as image data read by the scanning function. Each of the MFPs 1, 2 has functions capable of operations of browsing, varying, newly setting, etc., in the MFPs 1, 2 from the PC 3 accessed to the MFPs 1, 2 via the network 4.

Figure 2:
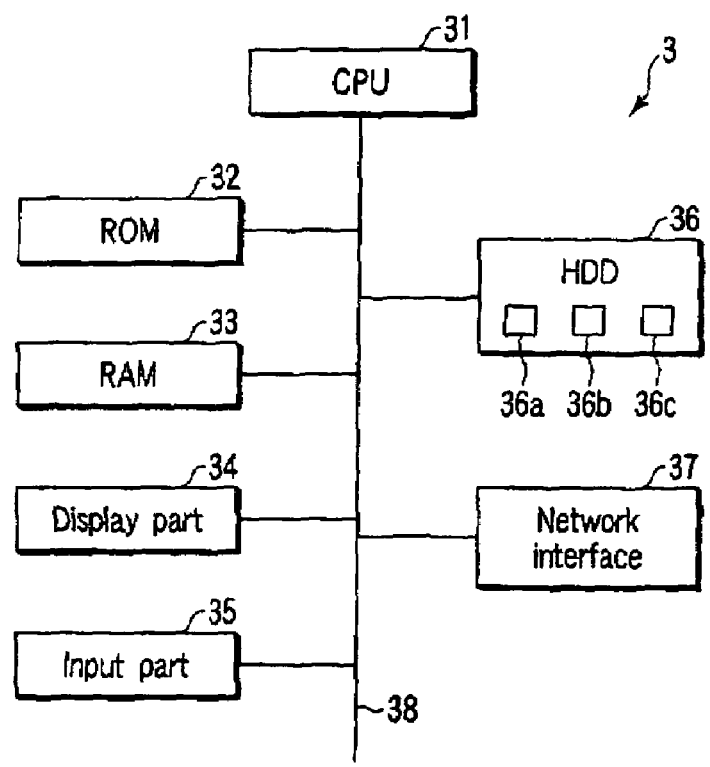
FIG. 2 is a block diagram showing a main part of a control structure of the computer apparatus in the embodiment.

FIG. 2 is a block diagram showing the main part of the control structure of the PC 3. The PC 3 has a CPU 31, a ROM 32, a RAM 33, a display part 34, an input part 35, an HDD 36 and a network interface 37. The CPU 31 is connected to the ROM 32, RAM 33, display part 34, input part 35, HDD 36 and network interface 37 via a bus line 38.

The CPU 31 generally controls each part by executing a control program stored in the ROM 32. The control program executed by the CPU 31 is stored into the ROM 32. A working area becoming necessary for the CPU 31 to conduct a variety of pieces of processing is formed in the RAM 33. The display part 34 is, for example, a display and displays information to the user. The input part 35 is, for example, a keyboard or a mouse and used for an input instructed by the user. The HDD 36 stores the control program to perform, as described later, conversion processing of the data files and the work such as browsing, varying and newly setting in the MFPs 1 from the PC 3 accessed via the network 4. The HDD 36 has a type data storing part 36*a*, a data file storing part 36*b* and a data file storing part 36*c*. The storing part 36*a* stores the data in the file types of the data files corresponding to the models of MFPs such as MFPs 1, 2. The storing part 36*b* stores the data files when acquiring the data files such as address data and template data from the MFPs 1, 2 connected to the network 4. The storing part 36*c* stores the data files of which the file types are converted after performing the after-mentioned conversion processing to the data files stored in the storing part 36*b*.

Figure 3:
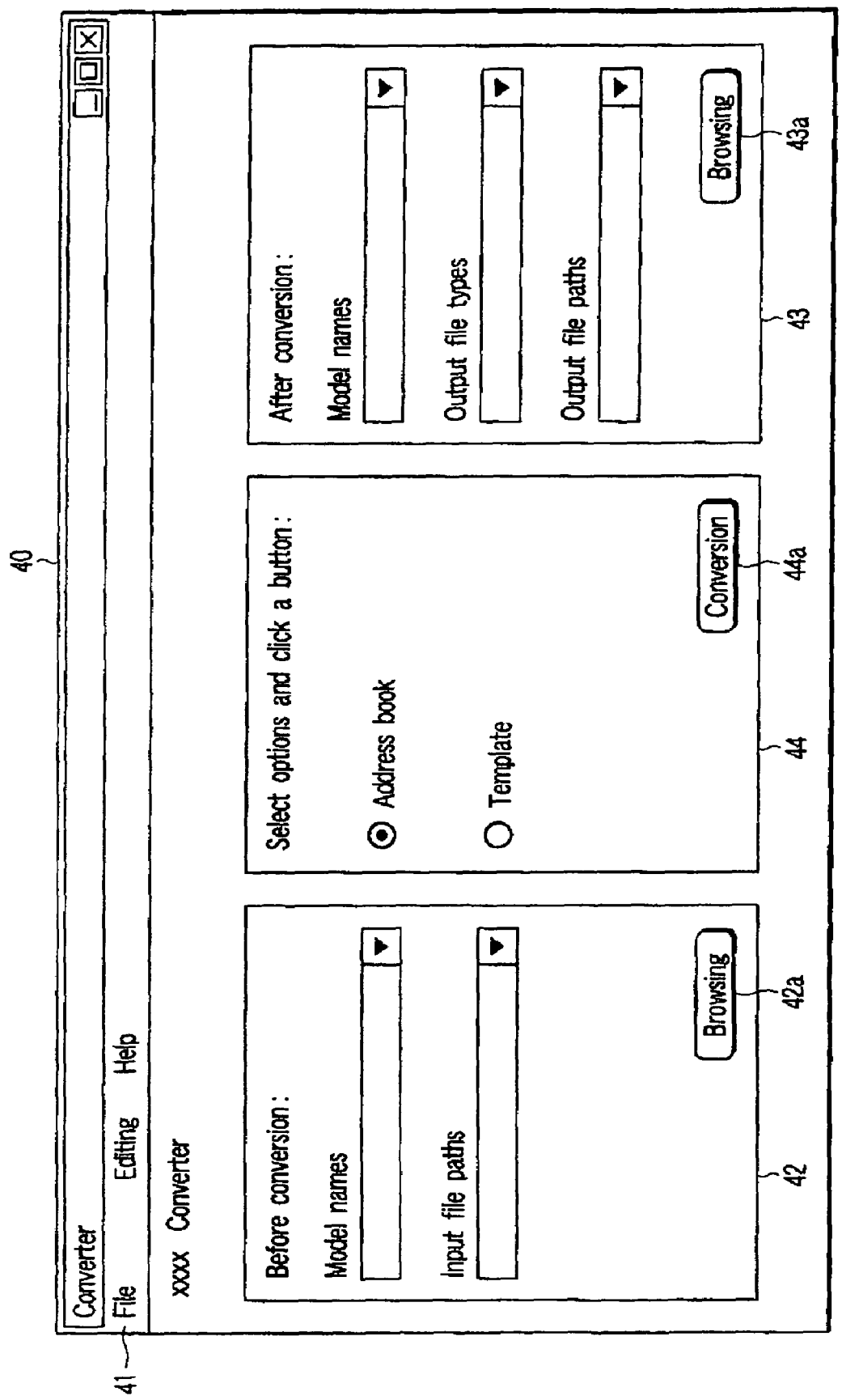
FIG. 3 is an illustration showing a user interface in the embodiment.

FIG. 3 is an illustration showing a user interface 40 displayed on the display part 34 when the user converts, for example, the data files acquired from the MFP 1 from the file types matching the MFP 1 into the file types matching the MFP 2. As shown in FIG. 3, in the user interface 40, "File", "Editing" and "Help" are provided as a menu with a menu bar 41. If the user specifies "File", a menu is newly opened. With a prescribed operation by the user from the menu, the user can read the data files from the address data storing parts 11 and the templates data storing parts 12 in the HDD 10 connected to the network 4 and store the read data files into the storing part 36*b* in the HDD 36 of the PC 3.

A first reception part 42, a second reception part 43 and a third reception part 44 are provided with the user interface 40. The first reception part 42 receives the selection of the model name and the storage destinations of the data files before the conversion from the user. The second reception part 43 receives the selection of the model name, the file types and storage destinations of the data files after the conversion from the user. The selections of an input file path and an output file path can be conducted with reference to a folder, etc., in the HDD 36 by clicking browsing buttons 42*a*, 43*a* disposed at the first and second reception parts 42, 43, respectively. The third reception part 44 receives the selection whether the data files to be converted are the files of an address book or the files of templates. In the third reception part 44, a conversion button 44*a* for receiving an instruction to convert the data files received at the first reception part 42 into the file types of the data files received at the second reception part 43 is disposed.

Figure 4:
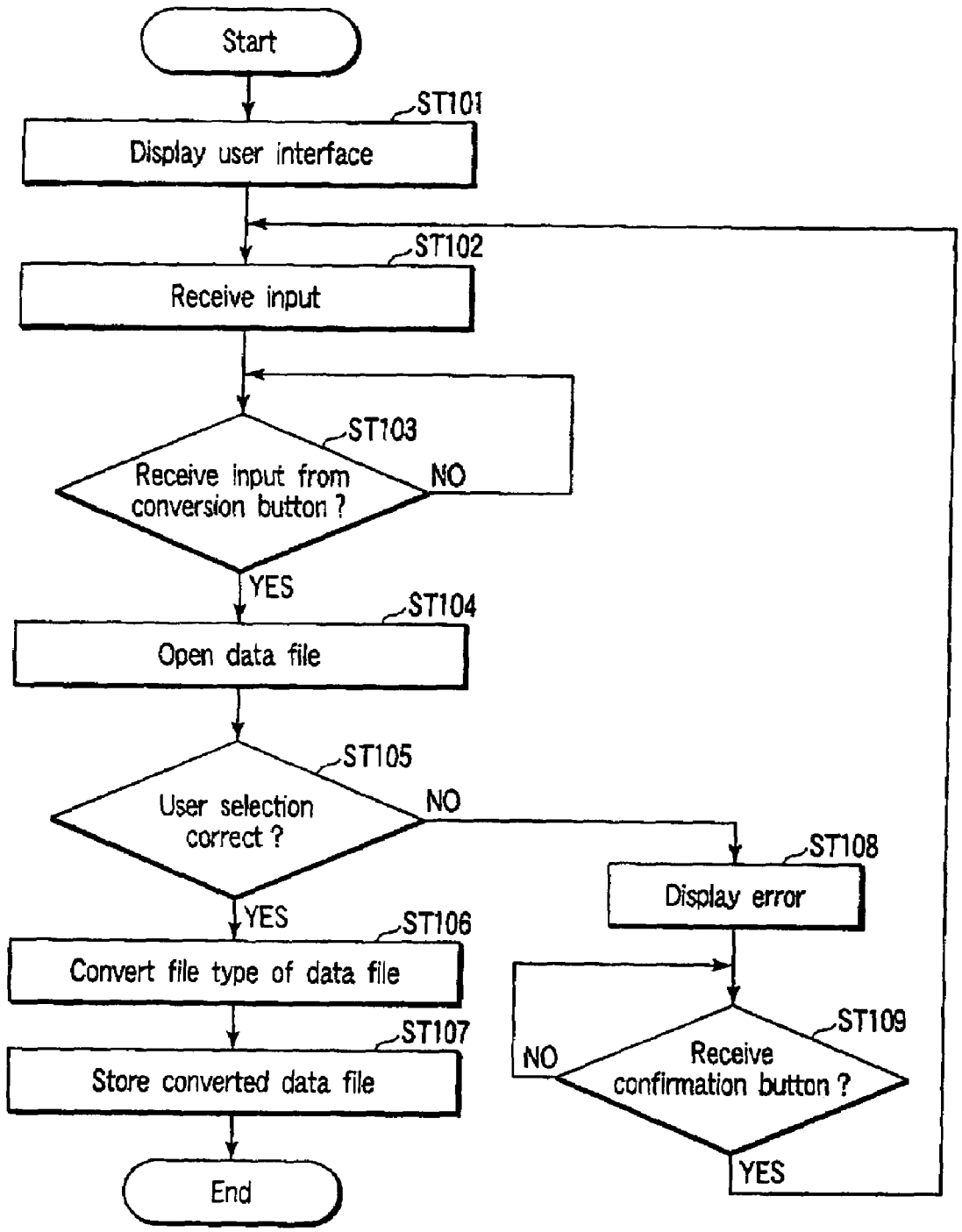
FIG. 4 is a flowchart showing processing in the embodiment.

Next, the conversion processing of the data file executed by the CPU 31 will be explained by referring to the flowchart in FIG. 4.

When receiving the described instruction from the user, the CPU 31 displays the interface 40 explained in FIG. 3 on the display part 34 (ST101). The CPU 31 receives the selection of the model names of the MFPs and the input file paths from the first reception part 42, and also receives the selection of the model names of the MFPs, the output file types and the output file paths from the second reception part 43 (ST102). The CPU 31 determines whether or not it receives the input from the conversion button 44*a* (ST103). The CPU 31 conducts the processing of step ST102 until receiving the input from the conversion button 44*a*. If the CPU 31 determines that it receives the input from the conversion button 44*a*, it opens the data files, based on the input file paths selected by the first reception part 42 (ST104). Then, the CPU 31 determines whether the input by the user is correct or not (ST105). That is, the CPU 31 determines whether or not the data files of the file types set into the model of the MFP selected by the user can be read out from the storage destinations selected by the input file paths. If the CPU 31 determines that the input by the user is correct, it conducts the processing to convert the file types of the data files (ST106). The conversion processing of the file types of the data files will be explained later by referring to FIG. 5. Then, the CPU 31 stores the data files of which the file types are converted into the storage destinations in the HDD 36 received by the second reception part 43 (ST107). On the other hand, if the CPU 31 determines that the input by the user is not correct in the determination in the step ST105, it displays an error message on the display part 34 by pop-up display (ST108). In this pop-up display, "confirmation button" for confirming the fact that the user has visually recognized as well as the contents of the error are displayed. Then, the CPU 31 determines whether or not the "confirmation button" is clicked (ST109). The CPU 31 continues this state until determining that the "confirmation button" is clicked, and if it determines that the "confirmation button" is clicked, it returns to the process in the step ST102 and receives the input from the user. If the "confirmation button" is clicked, the display by the pop-up display displayed on the display part 34 disappears.

Figure 5:
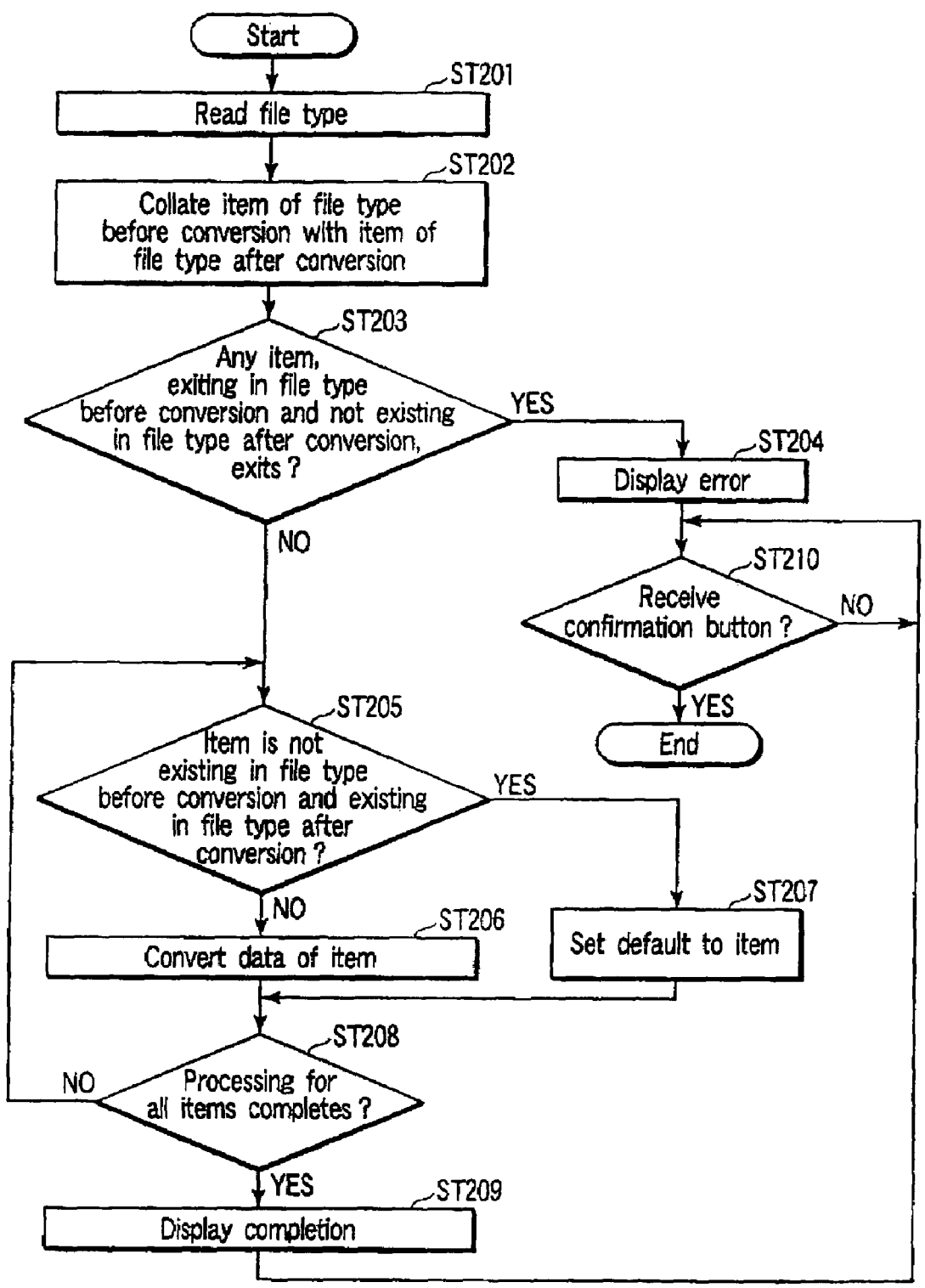
FIG. 5 is a flowchart showing conversion processing in FIG. 4.

Next, the processing to convert the file types of the data files in the step ST106 in FIG. 4 will be explained by referring to the flowchart In FIG. 5.

The CPU 31 firstly reads out the data regarding the file types set into the MFPs to which the selection is received by the second reception part 43 from the storing part 36*a* (ST201). Then; the CPU 31 collates the items of the file types (file types before conversion) of the data files read out in the step ST106 with the items of the file types (file types after conversion) read out from the storing part 36*a* (ST202). CPU 31 determines whether or not the items of the file type before the conversion do not exist in the items of the file type after the conversion, based on the collation result. If the CPU 31 determines "YES" in this determination, it displays the error message indicating the fact of stoppage of the conversion processing on the display part 34 by the pop-up display (ST204). In this pop-up display, the "confirmation button" for confirming the fact that the user has visually recognized as well as the contents of the error are displayed.

If the CPU 31 determines "NO" in the determination in step ST203, it performs processing for each item of each of the file types before and after the conversion from step ST205 to step ST208. That is, at first the CPU 31 determines whether or not the items exist in the file types after the conversion regardless of the file types before the conversion (ST205). If the CPU 31 determines "NO" in this determination, it converts the data of the items from the file types before the conversion into the file types after the conversion (ST206). If the CPU 31 determines "YES" in the determination in step ST205, it sets the items so as to be brought into the default setting in the file types after the conversion (ST207). Then, the CPU 31 determines whether or not the processing for all of the items is completed (ST208). If determining "NO" in this determination, the CPU 31 returns to step ST205. Therefore, all of the items of the data file read out from storing part 36*b* is converted, and items existing only in the file types after the conversion can be set to the default. If the CPU 31 determines "YES" in the determination in step ST208, it display the message indicating the completion of the conversion processing onto the display part 34 by the pop-up display (ST209). In this pop-up display, the "confirmation button" for confirming the fact that the user has visually recognized as well as the contents of the error are displayed.

When displaying the error message onto the display part 34 by the pop-up display in step ST204, and when displaying the message indicating the completion of the conversion processing onto the display part 34 by the pop-up display in step ST209, the CPU 31 determines whether the "confirmation button" is clicked or not (ST210). The CPU 31 displays the pop-up display on the display part 34 until the "confirmation button" is clicked, and if determining that the "confirmation button" is clicked, the CPU 31 completes the conversion processing. If the "confirmation button" is clicked, the pop-up display displayed on the display part 34 disappears.

Next, the operation to shift the data files of the templates stored in the storing part 12 of the MFP 1 to the storing part 22 of the MFP 2 will be explained.

The user firstly operates the PC 3 to display the user interface 40 on the display part 34. The user clicks the "File" on the menu bar 41 to operate a described operation. Thereby, the prescribed data files are acquired from the templates in data storing part 12 of the HDD 10 of the MFP 1 and stored them in the storing part 36b in the HDD 36 of the PC 3.

The user selects the model name of the MFP 1 from the first reception part 42 of the user interface 40 and selects the storing part 36b with the data files of the templates acquired from the MFP 1 stored therein from the input file paths. Then, the user selects the model name of the MFP 2, the file type set the model of MFP 2 and the data file storing part 36c for storing a template data converted file type from the second reception part 43 of the user Interface 40. The user clicked the conversion button 44a after selecting the templates in the third reception part 44 of the interface 40. Thereby, the conversion processing of the file types of the template data is started.

Figure 6:
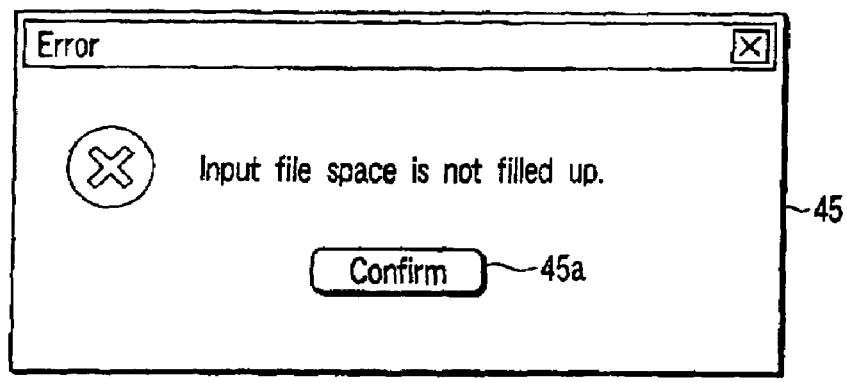
FIG. 6 is an illustration showing an example of error display in the embodiment.

At this time, if the selections by the user received by the first, second and third reception parts 42, 43 and 44 are not correct, or if the input file paths, etc., are not selected, the error message is displayed on the display part 34. At this time, for example, if the input file paths are not selected, a confirmation button 45a is displayed as well as an error message "Input file space is not filled up" are displayed as the pop-up display as shown in FIG. 6. If the button 45a is clicked, this pop-up display 45 disappears from the display part 34. The user corrects the erroneously selected items and selects the selection items not input yet through the user interface 40.

Figure 7:
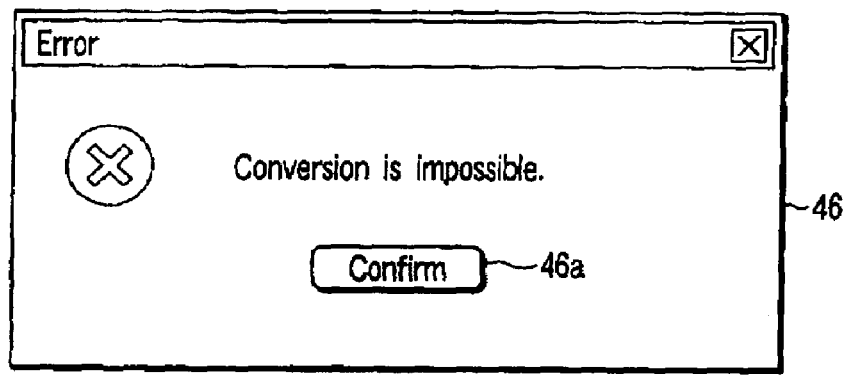
FIG. 7 is an illustration showing an another example of error display in the embodiment.

If the selections by the user at the first, second and third reception parts 42, 43 and 44 are correct, the CPU 31 collates the items of the file types of the template data before the conversion with the items of the file types of the template data after the conversion. If there is an item existing in the file types before the conversion and not existing in the items of the file types after the conversion, the error message is displayed on the display part 34. For example, as shown in FIG. 7, the error message indication "Conversion is impossible" and a confirmation button 46a is displayed on the display part 34 by pop-up display 46. Because if there is no items before the conversion in the items after the conversion, there is a possibility that the file types become the template data not desired by the user resulted from the conversion of the file types. Therefore, in that case, the template data not desired by the user is prevented from being created by inhibiting the conversion of the file types. If the button 46a is clicked, the pop-up display 46 disappears from the display part 34.

Figure 8:
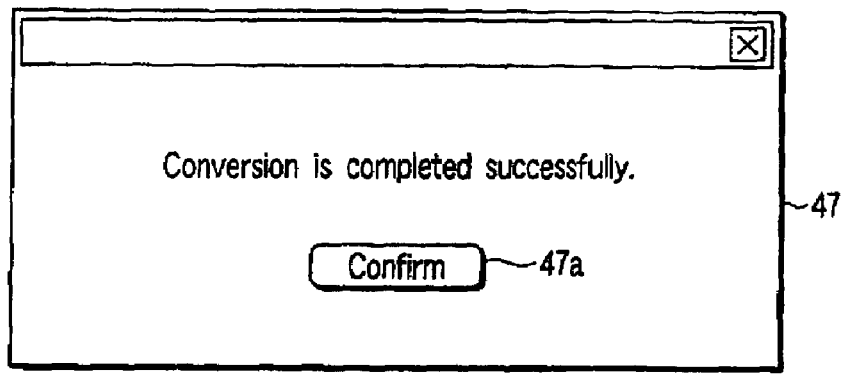
FIG. 8 is an illustration showing an example of completion display in the embodiment.

If the above described error is not generated, the conversion processing of the template data regarding each of the items is performed. That is, as for the items existing in the file types (file types before the conversion) of the template data read out from the storing part 36b and also existing in the file types (file types after the conversion) received from the second reception part 43, the data of the file types before the conversion is converted into the data of the file types after the conversion. As for the items existing in the file types before the conversion and not existing in the file types after the conversion, the defaults are set thereto. The setting of the default to such items is caused by the following reasons. When the MFPs are exchanged with each other, usually the model after exchanging has larger possibility to be added a function not provided with the model before exchanging than that of the model before exchanging. With adding such a function, the data files of the templates may be provided with new items. Because it is necessary for such items to be responded by setting the defaults thereto, since such items do not exist in the file types before exchanging. The data files of the templates of which the file types are converted are stored into the storing part 36c of the PC 3, based on the selections received by the second reception part 43. When the conversion processing of the file types of the template data is completed as just described, the display part 34 displays the message indicating the completion of the conversion. For example, as shown in FIG. 8, the display part 34 displays a confirmation button 47a by pop-up display 47 together with the message "Conversion is completed". This pop-up display 47 disappears from the display part 34 when the confirmation button 47a is clicked.

Figure 9:
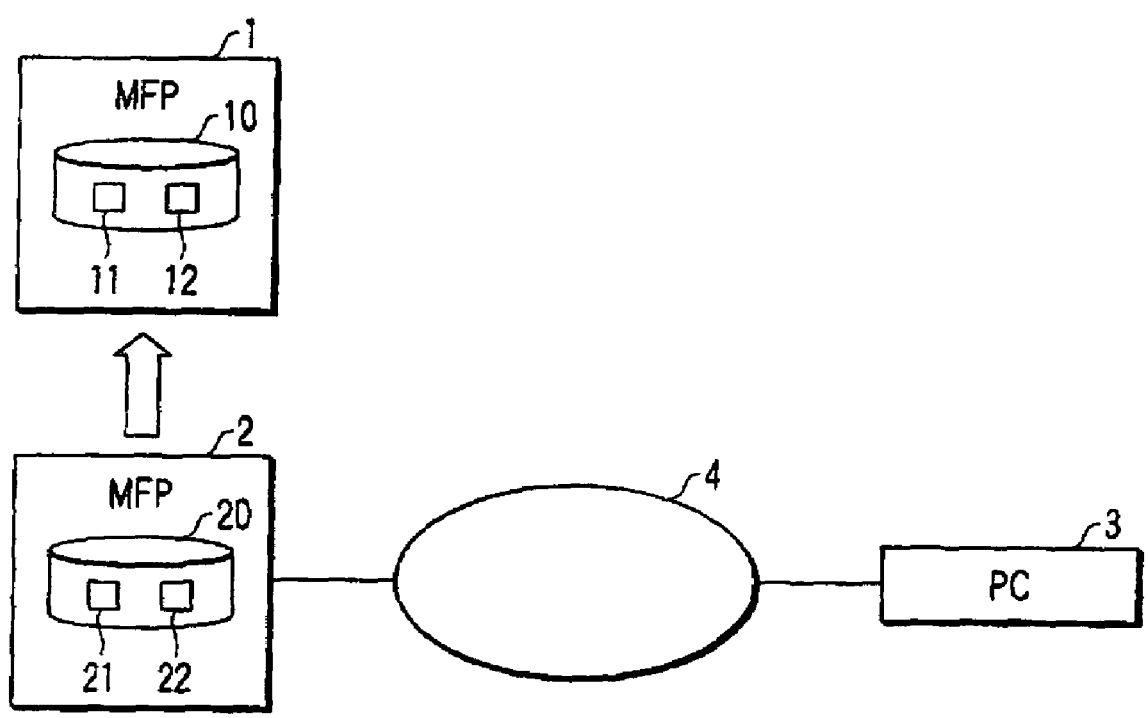
FIG. 9 is a schematic illustration showing the network after changing the image forming device in the embodiment.

As shown in FIG. 9, the user exchanges the MFP 1 with the MFP 2 and connects the MFP 2 to the network 4. After that, the user operates the PC 3 and conducts the process to output the converted data files of the template data stored in the storing part 36c in the HDD 36 to the storing part 22 in the HDD 20 of the MFP 2. Accordingly, template data of which the file types are converted is stored into the storing part 22 in the HDD 20 of the MFP 2. Consequently, according to this embodiment, the data files of the template data can be smoothly shifted from the MFP 1 to MFP 2 different in file type in storing the template data.

Although the embodiment has been explained in the case that the data files of the template data are shifted from the MFP 1 to MFP 2, the address data can be also shifted from the MFP 1 to MFP 2 by operating in the substantially same manner.

Although the embodiment has been explained in the case that the function to implement the invention is pre-recorded in the inside of the computer apparatus, the similar function not limited the above described case may be down loaded to the computer apparatus from the network and a recording medium with the similar function is recorded thereon may be installed in the computer apparatus. The recording medium may have any type, if only it is the one such as a CD-ROM capable of storing a program and also being read by the computer apparatus. The function obtained by pre-installing or pre-downloading may be the one that is achieved by cooperating with an operating system (OS) installed inside the computer apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. A computer apparatus, comprising:
   an interface to be communicably connected to an image forming device with data files in prescribed file types stored therein;
   a type data storing part which stores type data regarding file types set according to a model of the image forming device having a facsimile function and a network scanning function;
   a data file storing part which stores the data files in the prescribed file types acquired from the image forming device via the interface, wherein said data files are any one of address data indicating an address book used for the facsimile function and template data indicating templates used for setting the network scanning function;

a first reception part configured to receive a selection of the model of the image forming device with the data files acquired thereby and a selection of the data files stored in the data file storing part;

a second reception part configured to receive a selection of the model of the image forming device for outputting the data files, a selection of the file types different from the prescribed file types and a selection of storage destinations of the data files;

a third reception part configured to receive an instruction for converting the file types;

a conversion control part configured to convert the data files selected by the first reception part into the file types selected by the second reception part from the prescribed file types based on the type data stored in the type data storing part, when receiving the instruction at the third reception part; and a storage control part configured to store the data files converted by the conversion control part into the storage destinations selected by the second reception part, wherein the conversion control part further comprises:

a collation control part configured to collate items of the file types of the data files stored in the data file storing part with items of the file types received at the second reception part, based on the type data stored in the type data storing part; and a data conversion processing part configured to perform conversion processing of data of the items existing in the file types received by the second reception part among the items of the file types of the data files stored in the data file storing part, based on a collation result from the collation control part, if all of the items of the file types of the data files stored in the data file storing part existing in the items of the file types selected by the second reception part.

2. The computer apparatus, according to claim 1, further comprising a display part, wherein the selection of the first reception part, the selection of the second reception part and the instruction received at the third reception part are received from a user interface displayed on the display part.

3. The computer apparatus, according to claim 1, further comprising a determination control part configured to determine whether the selection received from the first reception part is correct or not, when receiving the instruction from the third reception part, wherein the conversion control part converts the file types when it determines that the selection is correct.

4. The computer apparatus, according to claim 1, wherein the conversion control part further comprises an error display control part configured to display an error onto the display part, based on a collation result from the collation control part, if the items of the file types of the data files stored in the data file storing part do not exist in the items of the file types selected by the second reception part.

5. The computer apparatus, according to claim 1, wherein the conversion control part further comprises a default data setting part configured to set default data to the items not existing in the items of the file types selected by the second reception part among the items of the file types of the data files stored in the data file storing part.

6. A computer implemented method of operating a computer apparatus having a type data storing part which stores type data regarding to file types set according to a model of an image forming device having a facsimile function and a network scanning function, and a data file storing part which stores data files of described file types acquired from the image forming device, said data files are any one of address data indicating an address book used for the facsimile function and template data indicating templates used for setting the network scanning function, comprising:

receiving a selection of the model of the image forming device with the data files acquire thereby and the data files stored in the data file storing part, and selections of the model of the image forming device outputting the data files, file types different from the described file types and storage destinations of the data files;

receiving an instruction for converting the file types;

converting the data files stored into the data file storing part into the file types different from the described file types, based on the type data stored in the type data storing part;

storing the converted data files into the storage destinations of the data files;

collating the items of the file types of the data files stored in the data file storing part with the items of the file types different from the described file types, based on the type data stored in the type data storing part; and performing conversion processing of data of the items in the file types different from the described file types among the items of the file types of the data files stored in the data file storing part, if all of the items of the file types of the data files stored in the data file storing part exist in the items of the file types different from the described file types, based on the collation result.

7. The method, according to claim 6, further comprising determining whether the model of the image forming device with the selected data files acquire thereby and the file types are correct or not when receiving the instruction, wherein the file types are convened when the determining determines that the model and the file types are correct.

8. The method, according to claim 6, further comprising displaying an error if the items of the file types of the data files stored in the data file storing part do not exist in the items of the file types different from the described file types, based on the collation result.

9. The method, according to claim 6, further comprising setting default data to the items not existing in the items of the files types different from the described file types among the items of the file types of the data files stored in the data file storing part.

10. A computer-readable storage device storing a program which, when executed by a computer having a type data storing part which stores type data regarding file types set according to a model of an image forming device having a facsimile function and a network scanning function and a data file storing part which stores data files of described file types acquired from the image forming device, said data files are any one of address data indicating an address book used for the facsimile function and template data indicating templates used for setting the network scanning function, causes the computer to perform functions comprising:

a function for receiving a selection of the model of the image forming device with the data files acquired thereby and the data files stored in the data file storing part, and selections of the model of the image forming device for outputting the data files, file types different from the described file types and storage destinations of the data files;

a function for receiving an instruction for converting the file types;

a function for converting the data files stored in the data file storing part into the file types different form the describe file types, based on the type data stored in the type data storing part;

a function for storing the converted data files into the storage destinations of the data files;

a function for collating the items of the file types of the data files stored in the data file storing part with the items of the file types different from the described file types, based on the type data stored in the type data storing part; and a function for performing conversion processing of data of the items in the file types different from the described file types among the items of the file types of the data files stored in the data file storing part, if all of the items of the file types of the data files stored in the data file storing part exist in the items of the file types different from the described file types, based on the collation result.

11. The computer program, according to claim 10, further comprising a function for determining whether the model of the image forming device with the selected data files acquired thereby and the file types are correct or not, when receiving the instruction, wherein the file types are convened when the function for determining determines that the model and the file types are correct.

12. The computer-readable storage device, according to claim 10, the functions performed further comprising a function for displaying an error if the items of the file types of the data files stored in the data file storing part do not exist in the items of the file types different from the described file type, based on the collation result.

13. The computer-readable storage device, according to claim 10, the functions performed further comprising a function for setting default data to the items not existing in the items of the file types different from the described file types among the items of the file types of the data files stored in the data file storing part.

* * * * *

UNITED STATES PATENT AND TRADEMARK OFFICE
CERTIFICATE OF CORRECTION

PATENT NO.         : 7,447,695 B2
APPLICATION NO.    : 11/023824
DATED              : November 4, 2008
INVENTOR(S)        : Goto It is certified that error appears in the above-identified patent and that said Letters Patent is hereby corrected as shown below:

On the Title Page, Item (57)

Abstract: replace "models of The" with --models of the--.

Column 5, line 20: replace "user Interface 40" with --user interface 40--.

Column 8, line 33: replace "convened" with --converted--.

Column 9, line 2: replace "describe" with --described--.

Column 10, line 3: replace "convened" with --converted--.

Signed and Sealed this

Tenth Day of February, 2009

JOHN DOLL
*Acting Director of the United States Patent and Trademark Office*